(12) United States Patent
Inoue et al.

(10) Patent No.: US 8,134,669 B2
(45) Date of Patent: Mar. 13, 2012

(54) LIQUID CRYSTAL DISPLAY DEVICE

(75) Inventors: Yuichi Inoue, Kameyama (JP); Takahiro Sasaki, Mie (JP); Takashi Sasabayashi, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 1303 days.

(21) Appl. No.: 11/366,458

(22) Filed: Mar. 3, 2006

(65) Prior Publication Data
US 2006/0221023 A1    Oct. 5, 2006

(30) Foreign Application Priority Data

Mar. 31, 2005    (JP) ................................. 2005-103027

(51) Int. Cl.
*G02F 1/1337*    (2006.01)
(52) U.S. Cl. ........... 349/128; 349/129; 349/130; 345/87
(58) Field of Classification Search ............ 345/87–104; 349/123–136
See application file for complete search history.

(56) References Cited

U.S. PATENT DOCUMENTS

| | | | |
|---|---|---|---|
| 6,335,780 B1 * | 1/2002 | Kurihara et al. | 349/156 |
| 6,424,398 B1 * | 7/2002 | Taniguchi | 349/143 |
| 6,476,786 B1 * | 11/2002 | Miyachi | 345/90 |
| 2003/0058264 A1 | 3/2003 | Takako et al. | |
| 2003/0231272 A1 * | 12/2003 | Nakamura et al. | 349/123 |

FOREIGN PATENT DOCUMENTS

| | | |
|---|---|---|
| JP | 11-337963 | * 10/1999 |
| JP | 2000-155317 | * 6/2000 |
| JP | 2003-172915 | 6/2003 |
| JP | 2003-195328 | 7/2003 |
| JP | 2003-330043 | 11/2003 |

* cited by examiner

*Primary Examiner* — Seokyun Moon
(74) *Attorney, Agent, or Firm* — Harness, Dickey & Pierce, P.L.C.

(57) ABSTRACT

Disclosed is a liquid crystal display device including a TFT substrate on which a picture element electrode is provided for each picture element, a counter substrate having a common electrode provided thereon, and a liquid crystal contained between the TFT and counter substrates, the liquid crystal display device achieving to shorten response time (rise time) by utilizing the following phenomenon that when a voltage applied to the picture element electrode changes from a first voltage (e.g., black display voltage) to a second voltage (e.g., white display voltage), transmittance increases to maximum transmittance with a change in the state of the alignment of liquid crystal molecules and then decreases to transmittance in a stable state corresponding to the second voltage.

12 Claims, 14 Drawing Sheets

LIQUID CRYSTAL DISPLAY DEVICE

CROSS-REFERENCE TO RELATED APPLICATIONS

This application is based on and claims priority of Japanese Patent Application No. 2005-103027 filed on Mar. 31, 2005, the entire contents of which are incorporated herein by reference.

BACKGROUND OF THE INVENTION

1. Field of the Invention

The present invention relates to a liquid crystal display device used in a personal computer display, a television, a projector, or the like. In particular, the present invention relates to a liquid crystal display device which is excellent in response characteristics and suitable for displaying a moving picture.

2. Description of the Prior Art

Liquid crystal display devices have the advantages that they are thin and light and that they can be driven at low voltages and have low power consumption. Accordingly, liquid crystal display devices are being used in various kinds of electronic devices. In particular, active matrix liquid crystal display devices, in which a thin film transistor (TFT) as a switching element is provided for each picture element, are as excellent even in display quality as cathode-ray tube (CRT) displays. Accordingly, active matrix liquid crystal display devices are being used not only in personal computer displays but also in televisions, projectors, and the like.

A general liquid crystal display device has a structure in which a liquid crystal is contained between two substrates placed to face each other. On one substrate, TFTs, picture element electrodes, and the like are formed. On the other substrate, color filters, a common electrode, and the like are formed. Hereinafter, the substrate having the TFTs, the picture element electrodes, and the like formed thereon is referred to as a TFT substrate, and the substrate placed to face the TFT substrate is referred to as a counter substrate. Furthermore, a structure constructed by filling the space between the TFT and counter substrates with the liquid crystal is referred to as a liquid crystal panel.

On both sides of the liquid crystal panel in the thickness direction, polarizing plates are respectively placed. The amount of light passing through these two polarizing plates can be adjusted by applying a voltage between the picture element electrode and the common electrode to change the state of the alignment of liquid crystal molecules.

Heretofore, twisted nematic (TN) liquid crystal display devices have been widely used in which a liquid crystal with positive dielectric anisotropy is contained between two substrates and in which liquid crystal molecules are aligned in a twisted manner. However, TN liquid crystal display devices have the disadvantage that viewing angle characteristics are poor and that contrast and color greatly change when a screen is viewed from an oblique direction. Accordingly, multi-domain vertical alignment (MVA) liquid crystal display devices having favorable viewing angle characteristics are being developed and commercialized.

In an MVA liquid crystal display device, a liquid crystal with negative dielectric anisotropy is contained between two substrates, and alignment control structures are provided so that a plurality of regions (domains) in which the alignment directions of liquid crystal molecules are different from each other are formed in each picture element when a voltage is applied. As the alignment control structures, for example, protrusions made of dielectric material or slits provided in electrodes are used. Japanese Unexamined Patent Publications No. 2003-195328 and 2003-330043 disclose examples of liquid crystal display devices in which slits provided in picture element electrodes are used as alignment control structures.

FIG. 1 is an equivalent circuit diagram for one picture element of a liquid crystal display device. As shown in this FIG. 1, each picture element of the liquid crystal display device includes a TFT 10, a liquid crystal cell $C_{LC}$, and an auxiliary capacitance Cs. The liquid crystal cell $C_{LC}$ includes a picture element electrode, a common electrode, and a liquid crystal placed therebetween.

The TFT 10 is turned on or off by a scan signal supplied to a gate bus line 11. When the TFT 10 is turned on, a display signal (display voltage) is supplied from a data bus line 12 to the liquid crystal cell $C_{LC}$ and the auxiliary capacitance Cs. Thereafter, even when the TFT 10 is turned off, the voltage held by the liquid crystal cell $C_{LC}$ and the auxiliary capacitance Cs is applied to the liquid crystal.

In the liquid crystal display device, it takes a long time for all liquid crystal molecules in the picture element to be aligned in a predetermined direction according to a voltage since the application of the voltage between the picture element electrode and the common electrode. Furthermore, the liquid crystal molecules have dielectric anisotropy, and therefore the capacitance value of the liquid crystal cell $C_{LC}$ changes during a period after the application of the voltage before all the liquid crystal molecules are aligned in a predetermined direction. As a result, the voltage applied to the liquid crystal decreases. For this reason, the auxiliary capacitance Cs is connected in parallel to the liquid crystal cell $C_{LC}$ as shown in FIG. 1. Thus, a change in the voltage applied to the liquid crystal is reduced.

However, known liquid crystal display devices have the problem that response characteristics are not sufficient and that a lag occurs when a moving picture is displayed. FIG. 2 is a view showing response characteristics of a known liquid crystal display device with time after the first application of a display signal on the horizontal axis and transmittance (brightness) on the vertical axis. As shown in this FIG. 2, in many known liquid crystal display devices, when a black display state changes into a white display state, desired transmittance is not reached by the first application of a display signal, but the desired transmittance is reached by the second application of a display signal. Generally, when transmittance in a white display is assumed to be 100%, response time is defined using the time (rise time) τr required for the transmittance to change from 10% to 90% and the time (fall time) τf required for the transmittance to change from 90% to 10%.

In order to improve response characteristics of a liquid crystal display device, it is possible to conceive of modifying a liquid crystal material. However, under present circumstances, a liquid crystal material is not obtained which shows sufficient response characteristics when used in a liquid crystal display device and which satisfies both of display performance and long-term reliability.

It is also possible to conceive of increasing the capacitance value of an auxiliary capacitance Cs to reduce a decrease in an applied voltage caused by the dielectric anisotropy of liquid crystal molecules. However, in general, an electrode partially constituting the auxiliary capacitance Cs is formed of metal. Accordingly, if the size of the electrode is increased in order to increase the capacitance value of the auxiliary capacitance Cs, an aperture ratio decreases and a screen looks dark.

Against this background, a technology called overdrive has been developed which improves response characteristics by making innovations in a driving method. In this technology, when a black display changes into an intermediate tone display, a change in the states of liquid crystal molecules is accelerated by changing a voltage in three steps in the following sequence: a black display voltage (low voltage), a white display voltage (high voltage), and an intermediate tone display voltage (intermediate voltage).

However, in overdrive, a voltage supplied to a data bus line needs to be changed in three steps in the following sequence: a black display voltage, a white display voltage, and an intermediate tone display voltage. Thus, overdrive has the disadvantage that a driving circuit becomes complex. Furthermore, overdrive enables response time to be shortened when a black display is changed into an intermediate tone display, but does not enable the response time to be shortened when a black display is changed into a white display because a voltage higher than that in a white display cannot be applied.

Japanese Unexamined Patent Publication No. 2003-172915 discloses that when a black display is changed into a white display, a voltage higher than a white display voltage (maximum tone voltage) is applied. However, in this case, a display voltage also needs to be changed in three steps. Moreover, it becomes necessary to form TFTs having high breakdown voltages or a driver for driving. Thus, there also arises the problem that a change of design or a change of a process becomes necessary.

SUMMARY OF THE INVENTION

In view of the above, an object of the present invention is to provide a liquid crystal display device in which a complex driving circuit is unnecessary and which is excellent in response characteristics.

The above-described object is achieved by a liquid crystal display device including a first substrate on which a picture element electrode is provided for each picture element, a second substrate which is placed to face the first substrate and which has a common electrode provided thereon, and a liquid crystal contained between the first and second substrates. In this liquid crystal display device, when a voltage applied to the picture element electrode changes from a first voltage to a second voltage, transmittance increases to maximum transmittance with a change in a state of alignment of liquid crystal molecules and then decreases to transmittance in a stable state corresponding to the second voltage.

The inventors of the present application have simulated the behavior of liquid crystal molecules during a period after the application of a voltage to a liquid crystal layer before alignment stabilizes. As a result, it was revealed that, in some cases, transmittance is higher immediately before the alignment of the liquid crystal molecules stabilizes than after the alignment thereof stabilizes. By utilizing this phenomenon (hereinafter referred to as an overshoot), response time (rise time τr) can be shortened without using a special driving circuit such as used in overdrive.

Next, the inventors of the present application carried out various studies of conditions for the occurrence of an overshoot. As a result, it was revealed that in the case of an MVA liquid crystal display device, an overshoot is made to occur by setting the distance between alignment regulation structures (slits provided in picture element electrodes or a common electrode, bank-like protrusions made of dielectric material, or the like) to a value of not more than a certain value. Furthermore, it was revealed that in the case where the alignment regulation structures are slits, an overshoot can also be made to occur by setting the width of the slit in a certain range, and that in the case where the alignment regulation structures are protrusions, an overshoot can also be made to occur by setting each of the height and width of the protrusion in a certain range. The degree of an overshoot (overshoot ratio) can also be controlled by appropriately setting these conditions. Furthermore, an overshoot can also be made to occur by performing predetermined alignment treatment on an alignment film.

As described above, in the present invention, response time is shortened by utilizing the following phenomenon (overshoot): during a period after the application of a voltage to a liquid crystal layer before alignment stabilizes, transmittance increases to maximum transmittance with a change in the state of the alignment of liquid crystal molecules and then decreases to transmittance in a stable state corresponding to a second voltage. Accordingly, unlike overdrive, the present invention does not require a complex driving circuit.

DESCRIPTION OF THE PREFERRED EMBODIMENTS

Hereinafter, embodiments of the present invention will be described with reference to accompanying drawings.

First Embodiment

The inventors of the present application have simulated the behavior of liquid crystal molecules in an MVA liquid crystal display device during a period after the application of a voltage to a liquid crystal layer before alignment stabilizes. As a result, it was revealed that in an MVA liquid crystal display device, there is the phenomenon (overshoot) that transmittance (brightness) becomes higher immediately before the alignment of liquid crystal molecules stabilizes than after the alignment stabilizes. In the present invention, the response time of a liquid crystal display device is shortened by utilizing the overshoot.

Figure 3:
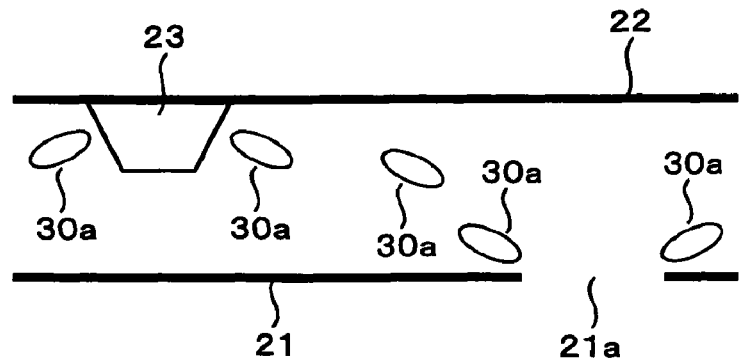
FIG. 3 is a schematic diagram showing one example of an MVA liquid crystal display device.

Before the overshoot will be described, an MVA liquid crystal display device will be described briefly. FIG. 3 is a schematic diagram showing one example of an MVA liquid crystal display device. In the MVA liquid crystal display device, picture element electrodes 21 are formed on one of two substrates constituting a liquid crystal panel, and a common electrode 22 is formed on the other substrate. Furthermore, at both ends of the liquid crystal panel in the thickness direction, polarizing plates (not shown) are placed with the absorption axes thereof perpendicular to each other.

In each picture element electrode 21, slits 21a are provided as alignment control structures. On a surface (lower surface in FIG. 3) of the common electrode 22, bank-like protrusions 23 made of dielectric material are provided as alignment control structures. Furthermore, a liquid crystal with negative dielectric anisotropy is contained between the picture element electrode 21 and the common electrode 22. The surfaces of the picture element electrode 21, the common electrode 22, and the protrusions 23 are covered with vertical alignment films (not shown) made of polyimide or the like.

In the above-described MVA liquid crystal display device, liquid crystal molecules 30a are aligned approximately perpendicular to the substrate plane in a state in which no voltage is applied between the picture element electrode 21 and the common electrode 22. It should be noted, however, that the liquid crystal molecules 30a in the vicinity of the protrusion 23 are aligned in directions perpendicular to inclined surfaces of the protrusion 23.

When a predetermined voltage is applied between the picture element electrode 21 and the common electrode 22, the liquid crystal molecules 30a tilt at an angle according to the voltage. It should be noted that, immediately after the application of the voltage, the liquid crystal molecules 30a in the vicinities of the protrusion 23 and the slit 21a tilt in the direction perpendicular to the direction in which the protrusion 23 and the slit 21a extend, but the liquid crystal molecules 30a at positions away from the protrusion 23 and the slit 21a are in an unstable state. This is because the tilt angles (angles formed by the normal to the substrate plane and the long axes of liquid crystal molecules) of the liquid crystal molecules 30a at positions away from the protrusion 23 and the slit 21a are determined according to the voltage but the tilt orientations (angles formed by lines obtained by projecting the long axes of the liquid crystal molecules onto the substrate plane and an X axis of a substrate) thereof are not determined.

Then, the state of the alignment of the liquid crystal molecules 30a in the vicinities of the protrusion 23 and the slit 21a propagate to the liquid crystal molecules 30a at positions away from the protrusion 23 and the slit 21a. Thus, the tilt orientations of these liquid crystal molecules 30a are determined, and a stable alignment state is reached.

Figure 4A:
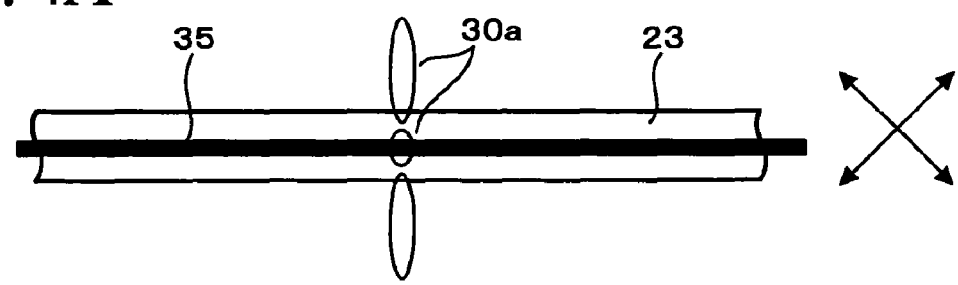
FIGS. 4A and 4B are schematic plan views showing the state of the alignment of liquid crystal molecules in a region in the vicinity of a protrusion.
Figure 4B:
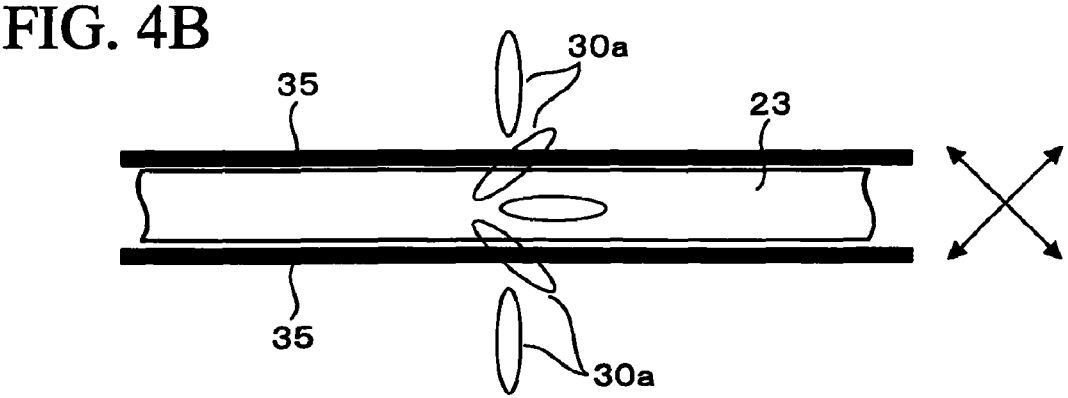

FIGS. 4A and 4B are schematic plan views showing the state of the alignment of the liquid crystal molecules in a region in the vicinity of the protrusion 23. Referring to these FIGS. 4A and 4B, a reason for the occurrence of an overshoot will be described. It should be noted that arrows in the drawings indicate the directions of the absorption axes of the two polarizing plates placed on opposite sides of the liquid crystal panel. In this case, a black display is produced when no voltage is applied between the picture element electrode and the common electrode (normally black).

Immediately after the application of a voltage between the picture element electrode and the common electrode, the liquid crystal molecules 30a on both sides of the protrusion 23 tilt in the orientation perpendicular to the direction in which the protrusion 23 extends as shown in FIG. 4A. However, the orientations in which the liquid crystal molecules 30a located at a center portion of the protrusion 23 tilt are not determined. In this state, one dark line 35 appears at the center of the protrusion 23.

Thereafter, when time has elapsed, the tilt orientations of the liquid crystal molecules 30a at the center portion of the protrusion 23 are determined so as to be continuous with the alignment of the liquid crystal molecules 30a on both sides of the protrusion 23 as shown in FIG. 4B. In this state, dark lines 35 appear in portions in which the tilt orientations of the liquid crystal molecules 30a are the same as the directions of the absorption axes of the polarizing plates, i.e., in the vicinities of both edges of the protrusion 23. In this state, transmittance is lower than in the state of FIG. 4A. An overshoot occurs due to this change in the number of dark lines 35.

Similarly, in the case where the alignment control structure is a slit, one dark line appears in a center portion of the slit immediately after the application of a voltage, and then two dark lines appear in the vicinities of both edges of the slit, whereby transmittance decreases.

Figure 5:
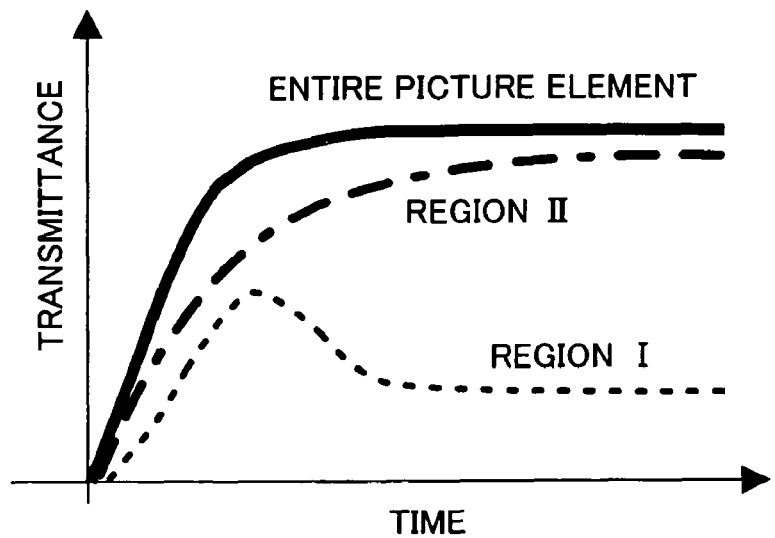
FIG. 5 is a view showing transmittance characteristics for the case where the response time of liquid crystal molecules in a region between alignment control structures (protrusion and slit) is long.

FIG. 5 is a view showing the change (transmittance characteristics) in transmittance during a period after the application of a display signal before transmittance stabilizes, with time on the horizontal axis and transmittance on the vertical axis. As described previously, the alignment of the liquid crystal molecules in regions (hereinafter referred to as "region I") in the vicinities of alignment control structures (protrusion and slit) stabilizes in a relatively short time after the application of the display signal to the picture element electrode. At this time, an overshoot occurs as indicated by a dashed line in FIG. 5.

On the other hand, the tilt directions of the liquid crystal molecules in a region (hereinafter referred to as "region II") away from the alignment control structures are not determined immediately after the application of the voltage. The liquid crystal molecules in region II are aligned in a predetermined direction after the alignment of the liquid crystal molecules in the vicinities of the alignment control structures propagates. Accordingly, as indicated by a dashed-dotted line in FIG. 5, it takes a relatively long time for the alignment of the liquid crystal molecules in region II to stabilize.

The transmittance of the entire picture element is the sum of the transmittance in region I and that in region II. Accordingly, in the case where it takes a long time for the alignment of the liquid crystal molecules in region II to stabilize, the overshoot occurring in region I is masked by transmittance characteristics in region II, and no overshoot occurs in transmittance characteristics of the entire picture element as indicated by a full line in FIG. 5.

Figure 6:
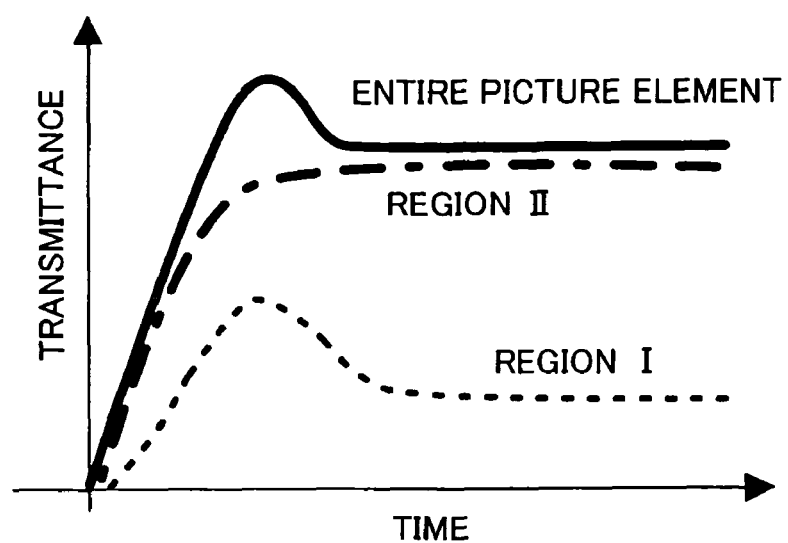
FIG. 6 is a view showing transmittance characteristics for the case where the response time of the liquid crystal molecules in the region between the alignment control structures (protrusion and slit) is short.

FIG. 6 is a view showing transmittance characteristics for the case where the response time of the liquid crystal molecules in a region between alignment control structures (protrusion and slit) is short. As shown in this FIG. 6, transmittance characteristics in a region (region I) in the vicinities of alignment control structures are the same as those of FIG. 5, but an overshoot is observed in transmittance characteristics of the entire picture element in the case where response time in a region (region II) away from the alignment control structures is short. In order to shorten the response time of the liquid crystal molecules in the region (region II) between the alignment control structures, for example, it is possible to conceive of reducing the distance between the protrusion and the slit.

Figure 7:
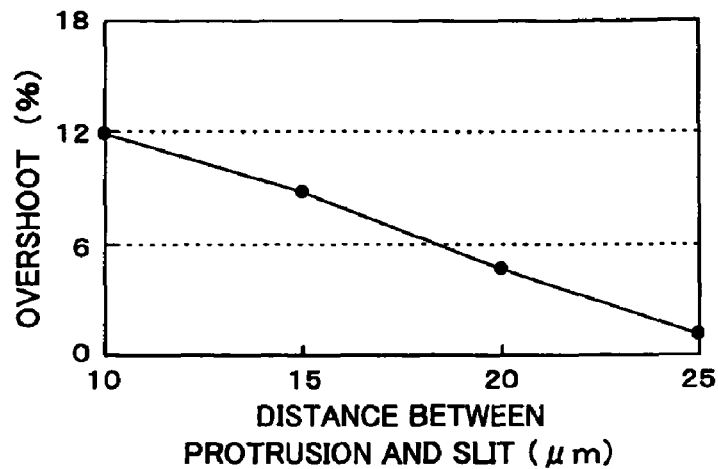
FIG. 7 is a view showing the result of simulating the relationship between the distance between the protrusion and the slit and an overshoot ratio.
Figure 8:
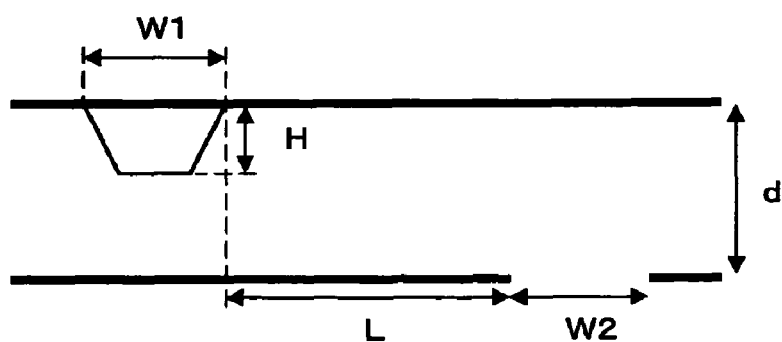
FIG. 8 is a diagram showing the height and width of the protrusion, the width of the slit, the distance between the protrusion and the slit, and the thickness of a liquid crystal layer.

The inventors of the present application have simulated the relationship between the distance between the protrusion and the slit and an overshoot ratio. The result is shown in FIG. 7. It should be noted that the distance between the protrusion and the slit is the length of a portion denoted by L in FIG. 8. Furthermore, the width W1 of the protrusion 23 is 12 µm, the height H of the protrusion 23 is 1.4 µm, the width W2 of the slit 21a is 10 µm, and the thickness (cell gap) d of the liquid crystal layer is 3.8 µm.

Figure 9:
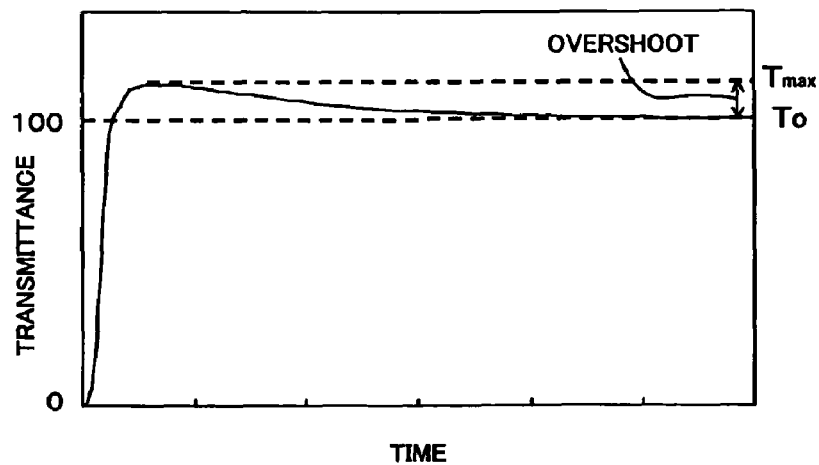
FIG. 9 is a view showing a definition of the overshoot ratio.

As can be seen from FIG. 7, when the distance L between the protrusion and the slit is 25 µm, the overshoot ratio is approximately 1% and at a substantially negligible level. However, when the distance L between the protrusion and the slit is set to 20 µm, 15 µm, and 10 µm, the overshoot ratio becomes approximately 5%, approximately 9%, and approximately 12%, respectively. It should be noted that, here, as shown in FIG. 9, the overshoot ratio is defined as $(T_{max} - T_0) \times 100 / T_0$, where $T_0$ is transmittance after stabilization in a white display and $T_{max}$ is the maximum transmittance.

As described above, when the distance L between the protrusion and the slit is set to 20 µm or less, the overshoot ratio becomes large. It should be noted, however, that if the distance L between the protrusion and the slit becomes smaller than 10 µm, the aperture ratio becomes extremely low because the ratio of the area of the alignment control structures (protrusion and slit) to the area of the picture element becomes large. Accordingly, the distance L between the protrusion and the slit is preferably set in the range of 10 to 20 µm. It should be noted that even if the distance L between the protrusion and the slit is 25 µm, a sufficient overshoot ratio can be ensured by appropriately setting other conditions (parameters).

Figure 10:
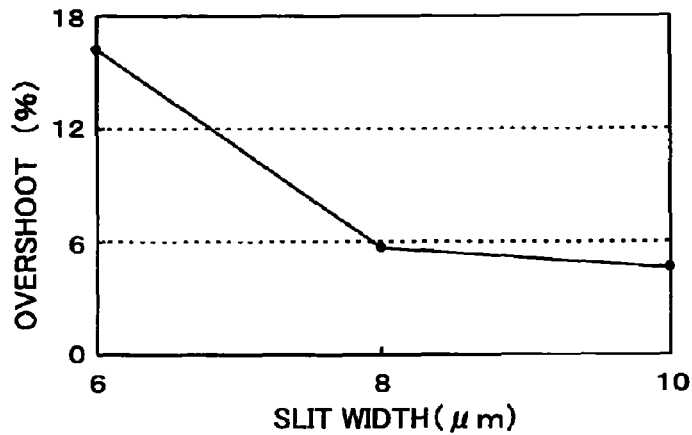
FIG. 10 is a view showing the result of simulating the relationship between the width W2 of the slit and the overshoot ratio.

FIG. 10 is a view showing the result of simulating the relationship between the width W2 of the slit and the overshoot ratio, with the width W2 of the slit on the horizontal axis and the overshoot ratio on the vertical axis. It should be noted that the width W1 of the protrusion is 12 µm, the height H of the protrusion is 1.4 µm, the distance L between the protrusion and the slit is 20 µm, and the thickness (cell gap) d of the liquid crystal layer is 3.8 µm.

As can be seen from this FIG. 10, when the width W2 of the slit is set to 10 µm or less, the overshoot ratio becomes approximately 5% or more. It should be noted, however, that if the width W2 of the slit becomes smaller than 6 µm, the quality of the alignment of the liquid crystal molecules in the vicinity of the slit becomes low. Accordingly, the width W2 of the slit is preferably set in the range of 6 to 10 µm.

Figure 11:
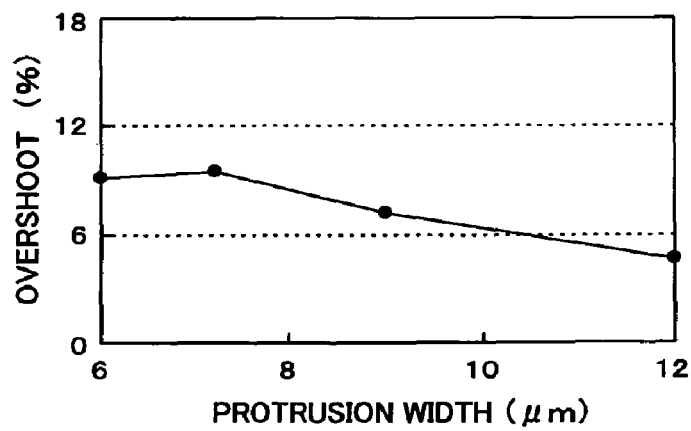
FIG. 11 is a view showing the result of simulating the relationship between the width W1 of the protrusion and the overshoot ratio.

FIG. 11 is a view showing the result of simulating the relationship between the width W1 of the protrusion and the overshoot ratio, with the width W1 of the protrusion on the horizontal axis and the overshoot ratio on the vertical axis. It should be noted that the height H of the protrusion is 1.4 µm, the width W2 of the slit is 10 µm, the distance L between the protrusion and the slit is 20 µm, and the thickness (cell gap) d of the liquid crystal layer is 3.8 µm. As can be seen from this FIG. 11, the overshoot ratio can be set to approximately 5% or more by setting the width W1 of the protrusion to 12 µm or less. It should be noted, however, that if the width W1 of the protrusion becomes smaller than 6 µm, the quality of the alignment of the liquid crystal molecules in the vicinity of the protrusion becomes low. Accordingly, the width W1 of the protrusion is preferably set in the range of 6 to 12 µm.

Figure 12:
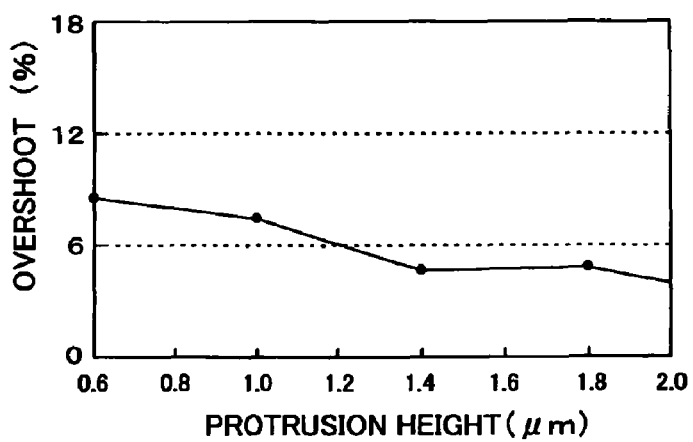
FIG. 12 is a view showing the result of simulating the relationship between the height H of the protrusion and the overshoot ratio.

FIG. 12 is a view showing the result of simulating the relationship between the height H of the protrusion and the overshoot ratio, with the height H of the protrusion on the horizontal axis and the overshoot ratio on the vertical axis. It should be noted that the width W1 of the protrusion is 12 µm, the width W2 of the slit is 10 µm, the distance L between the protrusion and the slit is 20 µm, and the thickness (cell gap) d of the liquid crystal layer is 3.8 µm.

As can be seen from this FIG. 12, the overshoot ratio can be set to approximately 5% or more by setting the height H of the protrusion to 1.4 µm or less. It should be noted, however, that if the height H of the protrusion becomes smaller than 0.7 µm, the quality of the alignment of the liquid crystal molecules in the vicinity of the protrusion becomes low. Accordingly, the height H of the protrusion is preferably set in the range of 0.7 to 1.4 µm.

Figure 13:
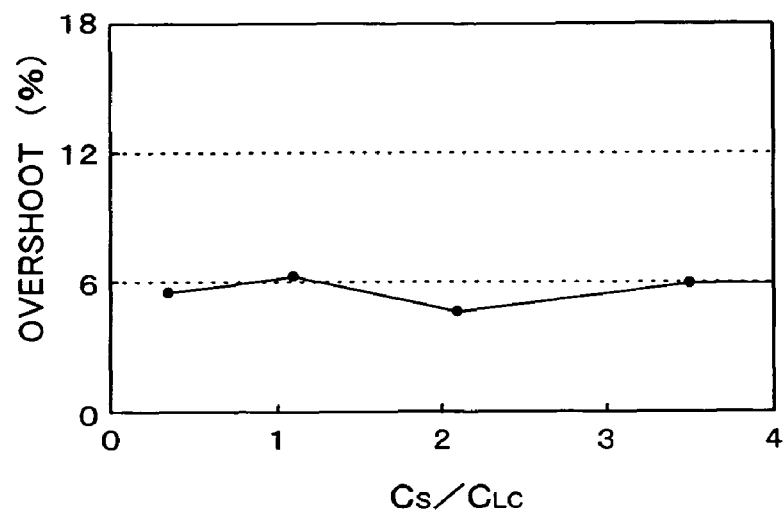
FIG. 13 is a view showing the result of simulating the relationship between the ratio ($Cs/C_{LC}$) of an auxiliary capacitance Cs to the capacitance $C_{LC}$ of a liquid crystal cell and the overshoot ratio.

FIG. 13 is a view showing the result of simulating the relationship between the ratio ($Cs/C_{LC}$) of an auxiliary capacitance Cs to the capacitance (hereinafter also referred to as liquid crystal capacitance) $C_{LC}$ of a liquid crystal cell with no voltage applied and the overshoot ratio, with the ratio $Cs/C_{LC}$ on the horizontal axis and the overshoot ratio on the vertical axis. In the case where the value of $Cs/C_{LC}$ is zero to one, since response speed becomes extremely low, the value of the auxiliary capacitance Cs has been heretofore set to a value of approximately twice the value of the liquid crystal capacitance $C_{LC}$. However, as shown in FIG. 13, the overshoot ratio hardly depends on the value of Cs. Accordingly, in a liquid crystal display device in which response speed is increased by utilizing an overshoot, a deterioration in display quality can be avoided even if the capacitance value of the auxiliary capacitance Cs is set to a value of not more than twice the capacitance value of the liquid crystal capacitance $C_{LC}$. On the other hand, since the aperture ratio becomes higher than heretofore by setting the capacitance value of the auxiliary capacitance Cs to a value of not more than twice the capacitance value of the liquid crystal capacitance $C_{LC}$, a bright display can be produced. It should be noted, however, that if the capacitance value of the auxiliary capacitance Cs is smaller than 0.5 times the capacitance value of the liquid crystal capacitance $C_{LC}$, a decrease in a write voltage (voltage applied to the liquid crystal layer during a period in which a TFT is off) becomes large. Accordingly, the value of the auxiliary capacitance Cs is preferably set to a value of 0.5 to 2.0 times the value of the liquid crystal capacitance $C_{LC}$.

By respectively setting these parameters to appropriate values, the overshoot ratio can be controlled to have a desired value. It should be noted, however, that if the overshoot ratio is too large, a change in brightness can be recognized even by visual inspection. Thus, display quality is deteriorated. Accordingly, the overshoot ratio is preferably set to 10% or less.

Figure 1:
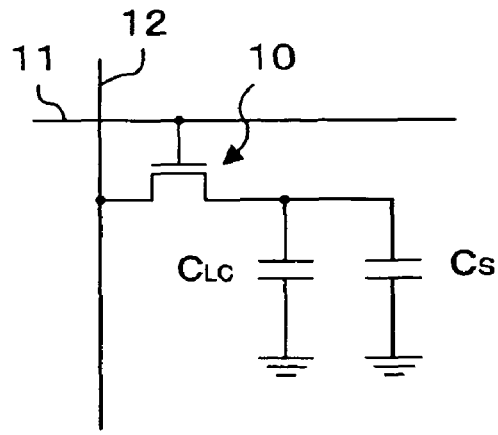
FIG. 1 is an equivalent circuit diagram for one picture element of a liquid crystal display device.
Figure 2:
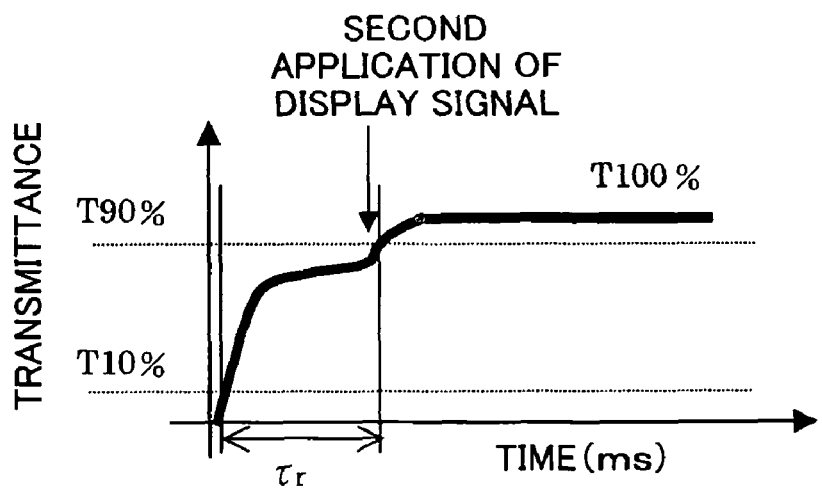
FIG. 2 is a view showing response characteristics of a known liquid crystal display device.
Figure 14:
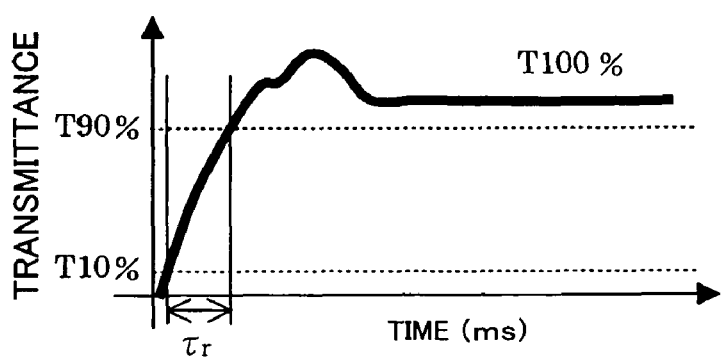
FIG. 14 is a view showing the change in the transmittance of a liquid crystal display device according to the present invention during a period after the application of a display signal before the transmittance stabilizes.

FIG. 14 is a view showing the change in the transmittance of a liquid crystal display device according to the present invention during a period after the application of a display signal before the transmittance stabilizes, with time on the horizontal axis and the transmittance (brightness) on the vertical axis. As shown in this FIG. 14, in the liquid crystal display device according to the present invention, the time (rise time) τr required for the transmittance to increase to 90% of that in a stable state is short because of the utilization of an overshoot. Thus, response characteristics are improved compared to those of a known liquid crystal display (see FIG. 2). Furthermore, the liquid crystal display device according to the present invention can be changed from a black display to a white display by changing a display voltage in two steps. That is, the liquid crystal display device of the present invention is different from those of a type in which driving is performed by changing a voltage in three steps, such as overdrive. Accordingly, a complex driving circuit is unnecessary.

Hereinafter, specific examples of a liquid crystal display device according to this embodiment will be described.

Figure 15:
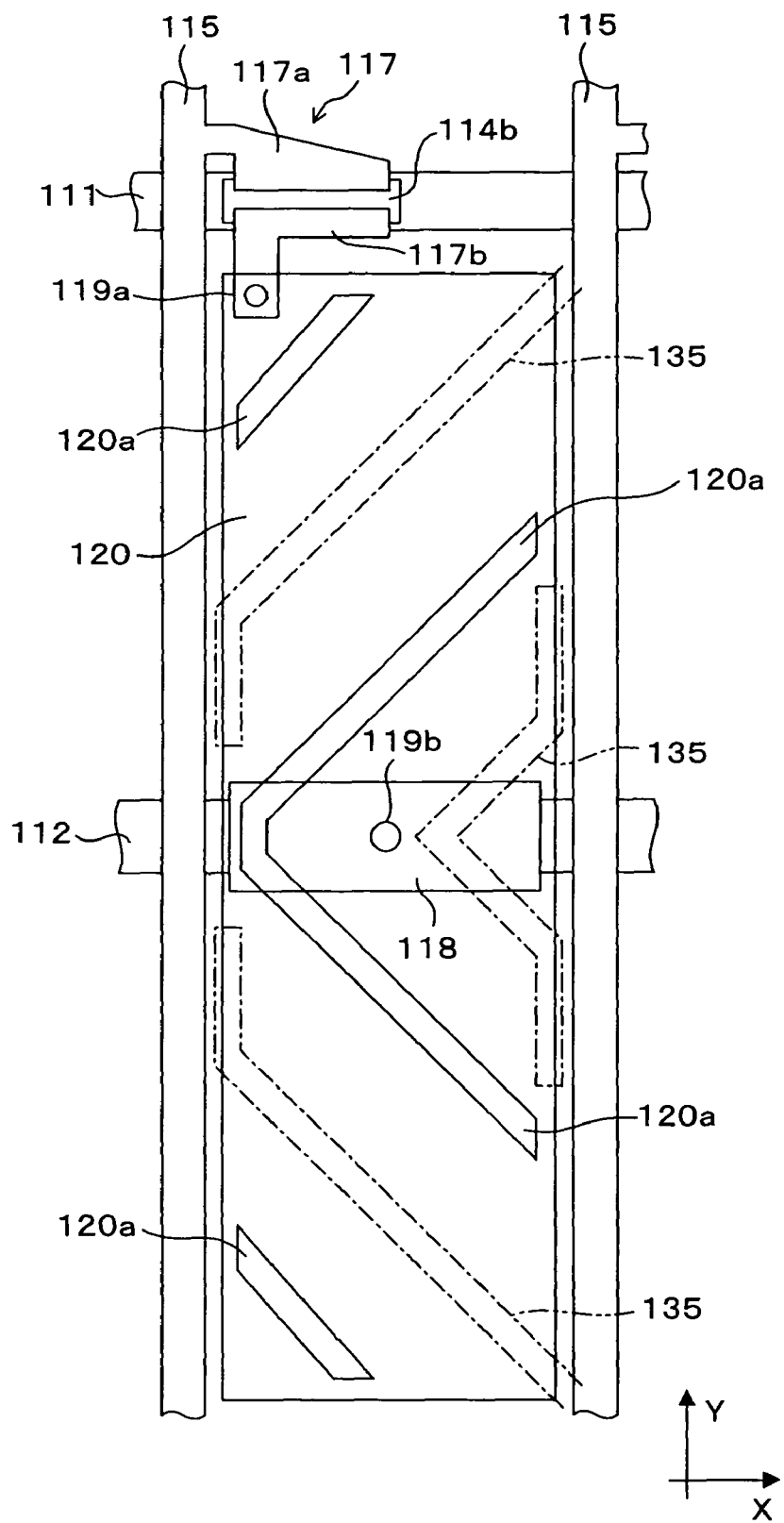
FIG. 15 is a plan view showing a liquid crystal display device of a first embodiment of the present invention.
Figure 16:
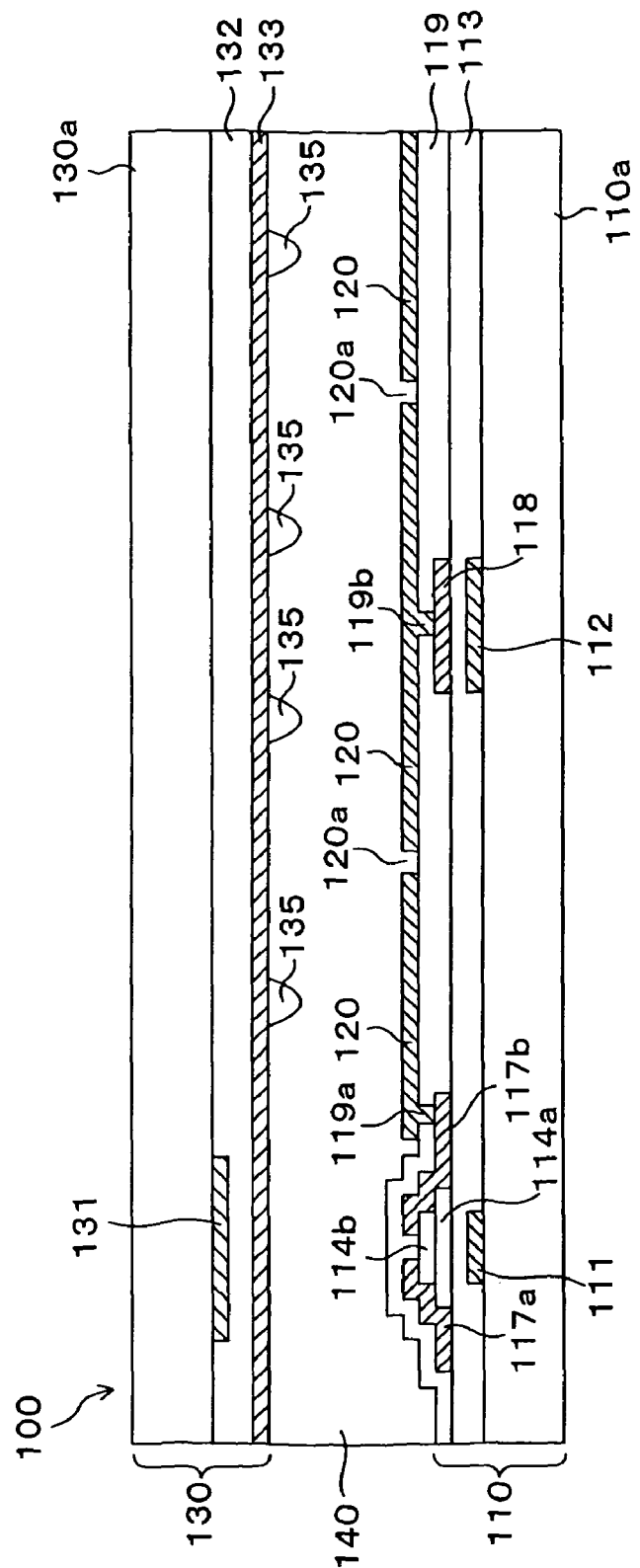
FIG. 16 is a schematic cross-sectional view of the same.

FIG. 15 is a plan view showing the liquid crystal display device of this embodiment, and FIG. 16 is a schematic cross-sectional view of the same.

As shown in FIG. 16, a liquid crystal panel 100 includes a TFT substrate 110, a counter substrate 130, and a liquid crystal layer 140 made of a liquid crystal (e.g., manufactured by Merck Ltd. and having Δ∈ of −3.8 and a nematic-isotropic phase transition temperature of 70° C.) which has negative dielectric anisotropy and which is contained between the TFT substrate 110 and the counter substrate 130. Polarizing plates (not shown) are placed on the front side (observer side, upper side in FIG. 16) and the back side (lower side in FIG. 16) of the liquid crystal panel 100, and a backlight (not shown) is further placed on the back side. One polarizing plate is placed with the absorption axis thereof aligned with the X axis shown in FIG. 15, and the other polarizing plate is placed with the absorption axis thereof aligned with the Y axis.

As shown in FIG. 15, on a glass substrate 110a which serves as a base of the TFT substrate 110, formed are a plurality of gate bus lines 111 extending in the horizontal direction (X-axis direction) and a plurality of data bus lines 115 extending in the vertical direction (Y-axis direction). The gate bus lines 111 are arranged with, for example, approximately 300 μm pitch in the vertical direction. The data bus lines 115 are arranged with, for example, approximately 100 μm pitch in the horizontal direction. Each of rectangular regions defined by the gate bus lines 111 and the data bus lines 115 is a picture element region. On the TFT substrate 110, auxiliary capacitance bus lines 112 are formed which are arranged parallel to the gate bus lines 111 and which cross middle portions of the picture element regions.

For each picture element region, a TFT 117, an auxiliary capacitance electrode 118, and a picture element electrode 120 are formed on the TFT substrate 110. The TFT 117 uses part of one gate bus line 111 as a gate electrode. As shown in FIG. 16, a semiconductor film 114a which serves as an active layer of the TFT 117 and a channel protective film 114b are formed over this gate electrode, and a drain electrode 117a and a source electrode 117b are formed on opposite sides of the semiconductor film 114a to face each other. The drain electrode 117a is connected to one data bus line 115.

The auxiliary capacitance electrode 118 is formed at a position where it faces the auxiliary capacitance bus line 112 with a first insulating film 113 interposed therebetween. The auxiliary capacitance electrode 118, the auxiliary capacitance bus line 112, and the first insulating film 113 placed therebetween constitute an auxiliary capacitance Cs. In this embodiment, the capacitance value of the auxiliary capacitance Cs is made equal to, for example, that of the liquid crystal capacitance $C_{LC}$ with no voltage applied.

The picture element electrode 120 is formed of transparent conductive material such as ITO. In the picture element electrode 120, slits 120a extending in directions oblique to the Y-axis direction are provided as alignment control structures. The slits 120a are formed to be approximately symmetric with respect to the center line of the auxiliary capacitance bus line 112.

Between each of the gate bus line 115, the TFT 117, and the auxiliary capacitance electrode 118a and the picture element electrode 120, a second insulating film 119 is formed. The picture element electrode 120 is electrically connected to the source electrode 117b and the auxiliary capacitance electrode 118 through contact holes 119a and 119b formed in the second insulating film 119. The surface of the picture element electrode 120 is covered with a vertical alignment film (not shown) formed of, for example, polyimide manufactured by JSR Corporation.

On the other hand, on the surface (lower surface in FIG. 16) of a glass substrate 130a which serves as a base of the counter substrate 130, formed are a black matrix (light-blocking film) 131, color filters 132, a common electrode 133, and bank-like protrusions 135 which are alignment control structures. The black matrix 131 is formed of metal such as Cr (chromium) or black resin. The black matrix 131 is placed at a position where it faces the gate bus lines 111, the data bus lines 115, and the TFTs 117 on the TFT substrate 110 side. The color filters 132 are classified into three types: red (R), green (G), and blue (B). In each picture element, a color filter of any one color is placed. The common electrode 133 is made of transparent conductive material such as ITO and formed on the surfaces (lower surfaces in FIG. 16) of the color filters 132. The bank-like protrusions 135 are formed of dielectric material (e.g., resist material manufactured by Shipley Company, LLC) such as resin. The protrusions 135 are formed parallel to the slits 120a in regions between the slits 120a of the picture element electrode 120 as shown in FIG. 15. The surfaces of the common electrode 133 and the protrusions 135 are covered with a vertical alignment film (not shown) formed of, for example, polyimide manufactured by JSR Corporation.

In this embodiment, an overshoot of 5% to 10% is made to occur by appropriately setting the distance L between the protrusion 135 and the slit 120a, the width W1 of the protrusion 135, the height H of the protrusion 135, and the width W2 of the slit 120a as described previously, thus shortening response time (rise time) τr.

Table 1 below shows the result of investigating the overshoot ratios and the response times (rise times) τr of liquid crystal display devices in which the distance L between the protrusion and the slit is set to 15 μm (example 1), 20 μm (example 2), and 25 μm (known example). It should be noted that in each of these liquid crystal display devices, the thickness (cell gap) d of the liquid crystal layer is 3.8 μm, the height H of the protrusion 135 is 1.4 μm, the width W1 of the protrusion 135 is 12 μm, and the width W2 of the slit 120a is 10 μm.

TABLE 1

|  | DISTANCE L | OVERSHOOT RATIO | RESPONSE TIME τr |
| --- | --- | --- | --- |
| EXAMPLE 1 | 20 μm | 5% | 8 ms |
| EXAMPLE 2 | 15 μm | 9% | 6 ms |
| KNOWN EXAMPLE | 25 μm | 1% | 14 ms |

As shown in this table 1, the overshoot ratio of the liquid crystal display device of the known example is 1%, whereas the overshoot ratios of the liquid crystal display devices of examples 1 and 2 are 5% and 9%, respectively. Furthermore, the response time τr of the liquid crystal display device of the known example is 14 ms, whereas the response times τr of the liquid crystal display devices of examples 1 and 2 are 8 ms and 6 ms, respectively. Thus, it has been confirmed that in the liquid crystal display device according to this embodiment, response time τr can be greatly shortened compared to that of the liquid crystal display device of the known example.

Second Embodiment

Figure 17A:
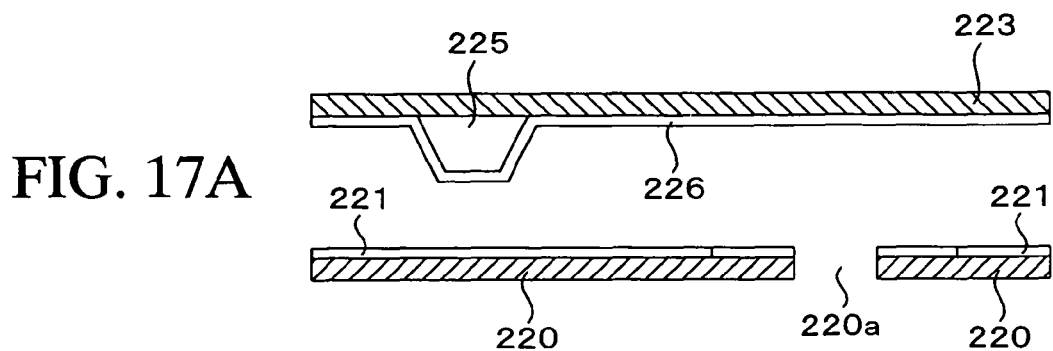
FIG. 17A is a schematic cross-sectional view showing a liquid crystal display device of a second embodiment of the present invention.
Figure 17B:
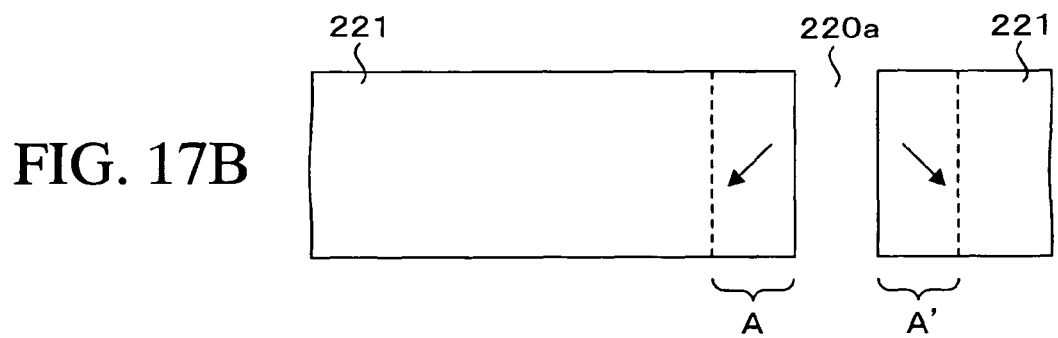
FIG. 17B is a schematic plan view of a TFT substrate of the same.
Figure 18A:
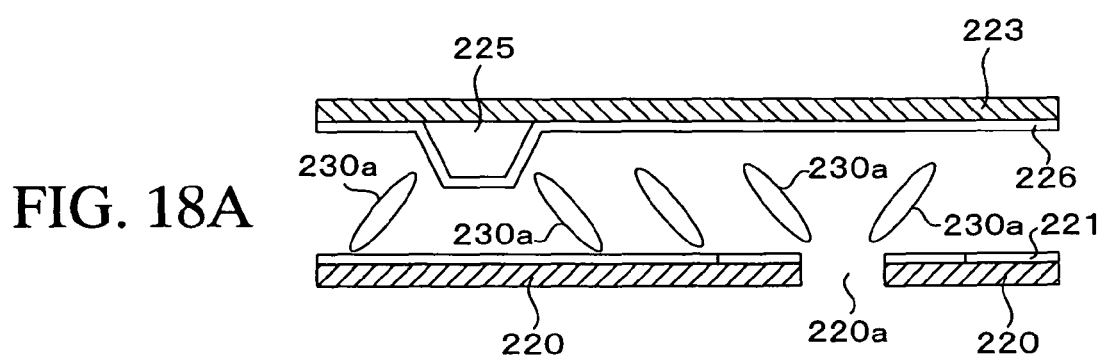
FIG. 18A is a schematic cross-sectional view showing the state of the alignment of liquid crystal molecules immediately after the application of a voltage.
Figure 18B:
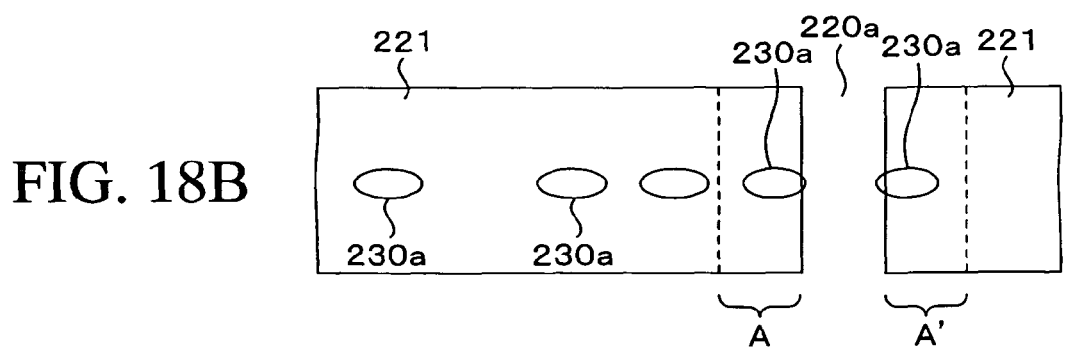
FIG. 18B is a schematic plan view of the same.
Figure 19A:
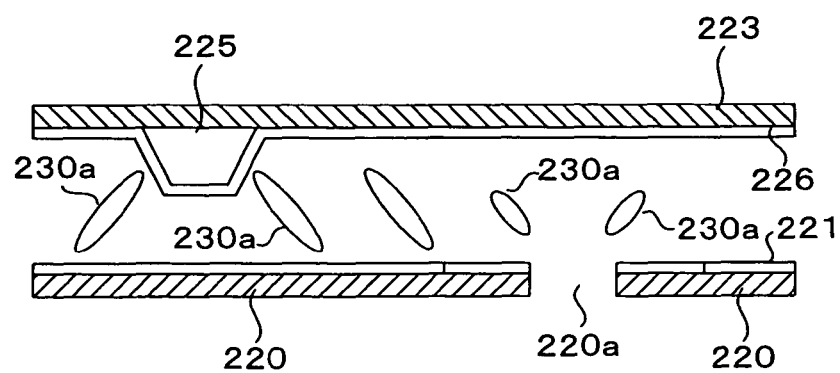
FIG. 19A is a schematic cross-sectional view showing the state of the alignment of the liquid crystal molecules after sufficient time has elapsed since the application of the voltage.
Figure 19B:
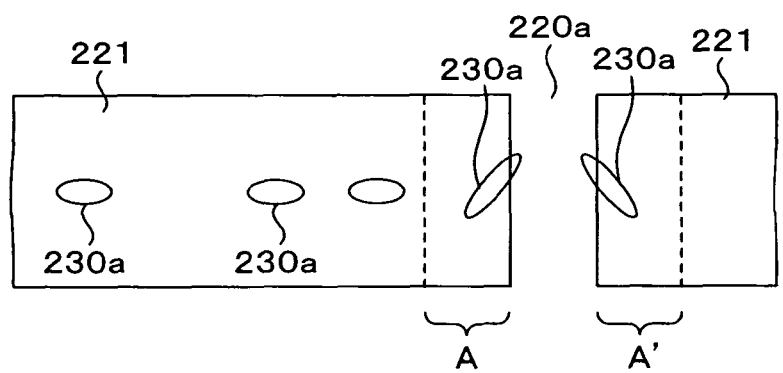
FIG. 19B is a schematic plan view of the same.

FIG. 17A is a schematic cross-sectional view showing a liquid crystal display device of a second embodiment of the present invention, and FIG. 17B is a schematic plan view of a TFT substrate of the same. Furthermore, FIG. 18A is a schematic cross-sectional view showing the state of the alignment of liquid crystal molecules immediately after the application of a voltage, and FIG. 18B is a schematic plan view of the same. Furthermore, FIG. 19A is a schematic cross-sectional view showing the state of the alignment of the liquid crystal molecules after sufficient time has elapsed since the application of the voltage, and FIG. 19B is a schematic plan view of the same.

In these FIGS. 17A, 17B, 18A, 18B, 19A, and 19B, 220 denotes a picture element electrode formed on the TFT substrate side, 220a denotes a slit (alignment control structure) provided in the picture element electrode 220, and 221 denotes a vertical alignment film covering the surface of the picture element electrode 220. Furthermore, 223 denotes a common electrode formed on the counter substrate side, 225 denotes a protrusion (alignment control structure) formed on the counter substrate side, 226 denotes a vertical alignment film covering the surfaces of the common electrode 223 and the protrusion 225, and 230a denotes a liquid crystal molecule. It should be noted that the basic structure of the liquid crystal display device of this embodiment is the same as that of the liquid crystal display device of the first embodiment shown in FIGS. 15 and 16, and therefore identical components will not be further described here.

In the liquid crystal display device of this embodiment, as shown in FIGS. 17A and 17B, rubbing is performed as alignment treatment on the alignment film 221 formed on the picture element electrode 220 in regions (regions denoted by A and A' in FIGS. 17A and 17B) in the vicinity of the slit 220a. Rubbing is performed by rubbing the surface of the alignment film with a cloth of nylon or the like in one direction. This provides alignment limiting force which limits to the rubbing direction (direction in which the cloth is moved) the tilt orientation of the liquid crystal molecules at the time of the application of a voltage. In this embodiment, rubbing is performed in a direction of 5° to 90° with respect to the direction perpendicular to the direction in which the slit 220a extends, more preferably in a direction of 5° to 60°.

In the liquid crystal display device of this embodiment which has the above-described constitution, the alignment limiting forces of the alignment control structures (protrusion 225 and slit 220a) are larger than that of the alignment film 221 immediately after the application of a voltage. Accordingly, as shown in FIGS. 18A and 18B, the liquid crystal molecules 230a are aligned in the direction perpendicular to the direction in which the alignment control structures (protrusion 225 and slit 220a) extend. When sufficient time has elapsed thereafter (e.g., one second thereafter), the influence of the alignment limiting force of the alignment film 221 appears. Thus, as shown in FIGS. 19A and 19B, the liquid crystal molecules 230a in regions A and A' subjected to rubbing are aligned in orientations deviated from an orientation (i.e., the direction perpendicular to the direction in which the alignment control structures extend) determined by the alignment control structures (protrusion 225 and slit 220a). As a result, the transmittance of the liquid crystal display device decreases. In the liquid crystal display device of this embodiment, an overshoot is made to occur as described above. In this case, in order to adjust the overshoot ratio, the orientations of the absorption axes of the polarizing plates may be slightly deviated from the orientations indicated by the X and Y axes in FIG. 15.

Figure 20:
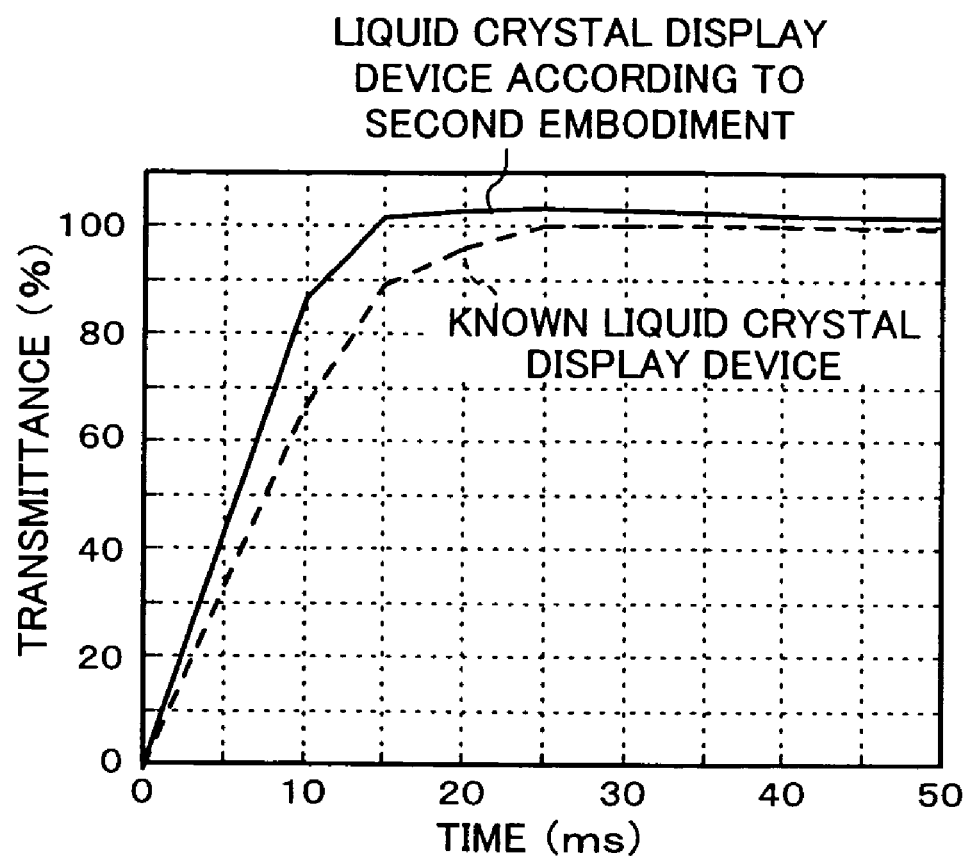
FIG. 20 is a view showing the result of investigating response characteristics of the liquid crystal display device according to the second embodiment of the present invention on which rubbing is performed in a direction of 45° with respect to a direction perpendicular to the direction in which a slit extends and response characteristics of a known liquid crystal display device on which rubbing is not performed.

FIG. 20 is a view showing the result of investigating response characteristics of the liquid crystal display device according to this embodiment on which rubbing is performed in a direction of 45° with respect to the direction perpendicular to the direction in which the slit 220a extend, and those of a known liquid crystal display device on which rubbing is not performed, with time on the horizontal axis and transmittance on the vertical axis. From this FIG. 20, it can be seen that an overshoot occurs in the liquid crystal display device of this embodiment and that response time (rise time) is shortened compared to that of the known liquid crystal display device.

Figure 21A:
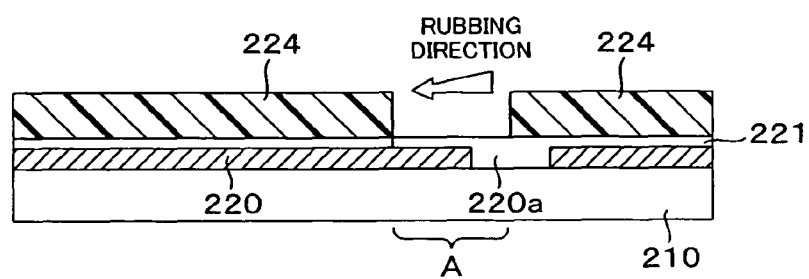
FIGS. 21A and 21B are schematic diagrams showing a rubbing method.
Figure 21B:
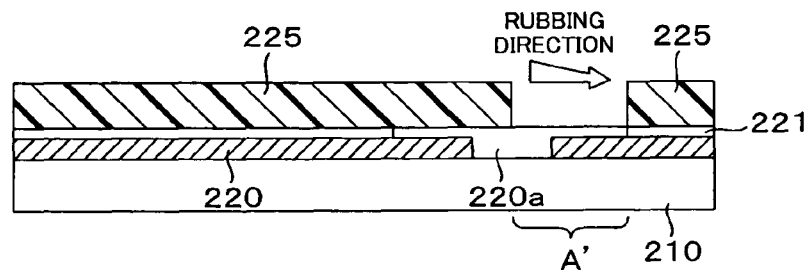

FIGS. 21A and 21B are schematic diagrams showing a rubbing method. As shown in FIG. 21A, the picture element electrode 220 and the alignment film 221 are formed on the substrate 210, and then a first resist film 224 having an opening portion in a portion corresponding to a desired region (region A) is formed by a photoresist method. Subsequently, the surface of the alignment film 221 is rubbed with a cloth of nylon or the like in one direction (first direction). Thereafter, the first resist film 224 is removed.

Next, as shown in FIG. 21B, a second resist film 225 having an opening portion in a portion corresponding to a desired region (region A') is formed by a photoresist method, and the surface of the alignment film 221 is rubbed with a cloth of nylon or the like in one direction (second direction). Thereafter, the second resist film 225 is removed.

In the case where the alignment film 221 is rubbed as described above, the overshoot ratio can be controlled by changing the number of times of rubbing and the strength (pressure) of rubbing.

Table 2 below shows the result of investigating the response time (rise time) τr of liquid crystal display devices of this embodiment in which rubbing is performed on regions in the vicinity of the slit by the aforementioned method. It should be noted that the overshoot ratios of the liquid crystal display devices of examples 3 and 4 are 3% and 9%, respectively. Furthermore, the result of investigating the response time of a liquid crystal display device (known example) on which rubbing is not performed is also shown. Here, the dielectric anisotropy $\Delta\in$ of the liquid crystal is −3.8, the refractive index anisotropy $\Delta n$ thereof is 0.09, the nematic-isotropic phase transition temperature thereof is 70° C., the size of one picture element is approximately 100 μm by 300 μm, and the capacitance value of the auxiliary capacitance Cs is the same as that of the liquid crystal capacitance $C_{LC}$. Moreover, the distance L between the protrusion and the slit is 25 μm, the height H of the protrusion is 1.4 μm, the width W1 of the protrusion is 12 μm, the width W2 of the slit is 10 μm, and the thickness (cell gap) d of the liquid crystal layer is 3.8 μm.

TABLE 2

| | OVERSHOOT RATIO | RESPONSE TIME τr |
|---|---|---|
| EXAMPLE 3 | 3% | 10 ms |
| EXAMPLE 4 | 6% | 8 ms |
| KNOWN EXAMPLE | 1% | 14 ms |

As shown in this table 2, the response time τr of the liquid crystal display device of example 3 is 10 ms, and the response time τr of the liquid crystal display device of example 4 is 8 ms. Thus, it has been confirmed that response time is shortened compared to that of the liquid crystal display device of the known example.

Figure 22A:
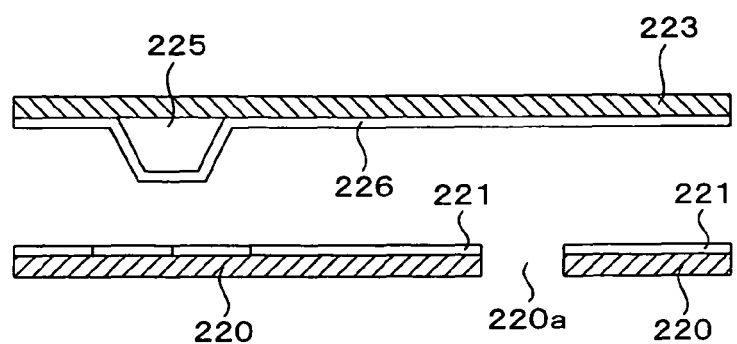
FIG. 22A is a schematic cross-sectional view showing a modified example (first modified example) of the second embodiment.
Figure 22B:
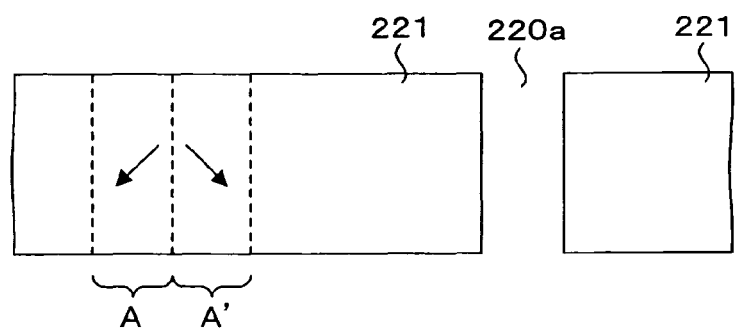
FIG. 22B is a schematic plan view of the same.
Figure 23A:
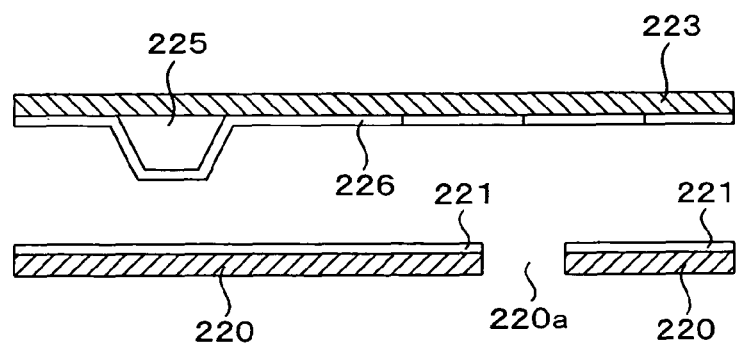
FIG. 23A is a schematic cross-sectional view showing a modified example (second modified example) of the second embodiment.
Figure 23B:
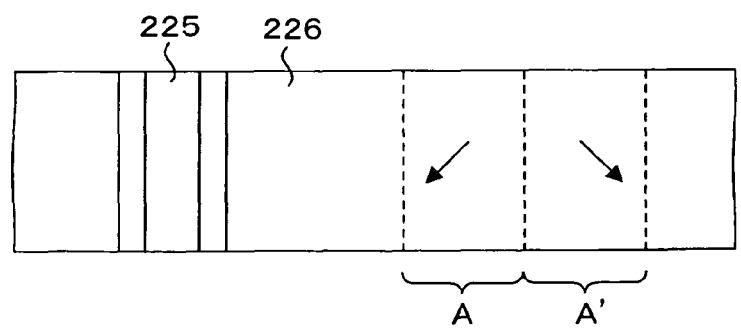
FIG. 23B is a schematic plan view of the same.

In the above-described embodiment, a description has been given of the case where an overshoot is made to occur by rubbing the alignment film in the vicinity of the slit. However, a similar effect can also be obtained by rubbing the alignment film 221 on the TFT substrate side in regions A and A' facing the protrusion 225 or in regions in the vicinity thereof as shown in FIGS. 22A and 22B. Alternatively, as shown in FIGS. 23A and 23B, rubbing may be performed on the alignment film 226 on the counter substrate side in regions A and A' in the vicinity of a region facing the slit 220a. Furthermore, a similar effect can also be obtained by applying ultraviolet light to an alignment film from an oblique direction, instead of rubbing. In the case where ultraviolet light is applied, the overshoot ratio can be adjusted by controlling the wavelength, intensity, and dose of ultraviolet light.

Figure 24A:
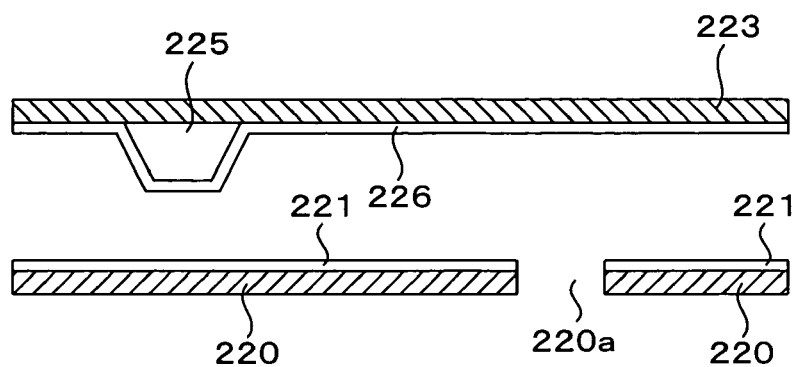
FIG. 24A is a schematic cross-sectional view showing a modified example (third modified example) of the second embodiment.
Figure 24B:
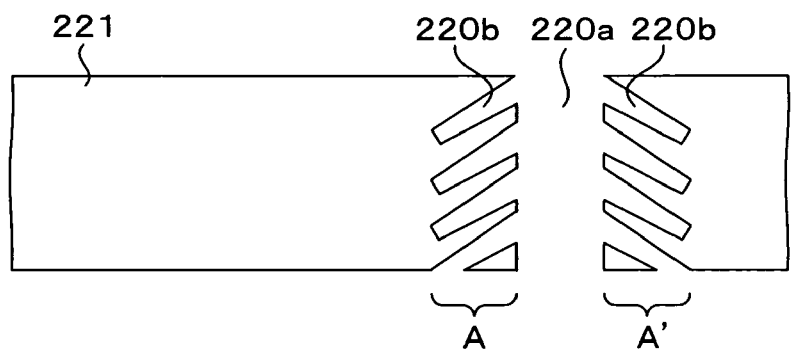
FIG. 24B is a schematic plan view of the same.

A similar effect can also be obtained by providing a plurality of fine slits 220b extending in a direction oblique to the slit 220a as shown in FIGS. 24A and 24B, instead of rubbing. In this case, the overshoot ratio can be adjusted by controlling the width and length of the fine slit 220b.

Instead of the fine slits 220b, a fine pattern made of a dielectric film may be formed in a shape similar to that of the fine slits 220b on the picture element electrode 220 or the common electrode 223. In this case, the overshoot ratio can be adjusted by controlling the width, length, and thickness of the fine pattern.

It should be noted that though the case where the present invention is applied to a normally black liquid crystal display device has been described in the first and second embodiments, a similar effect can also be obtained even if the present invention is applied to a normally white liquid crystal display device.

Furthermore, in the first and second embodiments, a description has been given of the case where as alignment control structures, slits are provided in electrodes (picture element electrodes) on a TFT substrate side and protrusions are provided on an electrode (common electrode) on a counter substrate side. However, the present invention is not limited to this. For example, as alignment control structures, slits may be provided in picture element electrodes and a common electrode, respectively. Moreover, as alignment control structures, protrusions may be provided on picture element electrodes and a common electrode, respectively. Furthermore, alignment control structures may be provided in only any one of a TFT substrate and a counter substrate.

What is claimed is:

1. A liquid crystal display device comprising:
   a first substrate on which a picture element electrode is provided for each picture element;
   a second substrate placed to face the first substrate, the second substrate having a common electrode provided thereon;
   alignment control films respectively covering surfaces of the picture element electrode and the common electrode; and
   alignment control structures for controlling directions of alignment of liquid crystal molecules, the alignment control structures being provided on at least one of the first and second substrates,
      wherein the alignment control structures are first slits provided in the picture element electrode and protrusions provided on the common electrode, a distance between at least one first slit and at least one protrusion being 10 to 25 μm,
      the first substrate is subjected to alignment treatment in only regions substantially directly facing the protrusions, and
      when a voltage applied to the picture element electrode changes from a first voltage to a second voltage, transmittance increases to maximum transmittance with a change in a state of alignment of liquid crystal molecules and then decreases to transmittance in a stable state corresponding to the second voltage.

2. The liquid crystal display device according to claim 1, wherein directions of the alignment treatment are deviated from directions of the protrusions by 5° to less than 90°.

3. The liquid crystal display device according to claim 1, wherein the alignment treatment is rubbing performed on the alignment film.

4. The liquid crystal display device according to claim 1, wherein the alignment treatment is ultraviolet light application in which ultraviolet light is applied to the alignment film from an oblique direction.

5. The liquid crystal display device according to claim 1, wherein the alignment treatment is formation of a plurality of second slits in the picture element electrode, the plurality of second slits extending in directions oblique to directions in which the protrusions extend.

6. The liquid crystal display device according to claim 1, wherein the alignment treatment is formation of a plurality of dielectric film patterns on the picture element electrode, the plurality of dielectric film patterns extending in directions oblique to directions in which the protrusions extend.

7. A liquid crystal display device comprising:
a first substrate on which a picture element electrode is provided for each picture element;
a second substrate placed to face the first substrate, the second substrate having a common electrode provided thereon;
a liquid crystal with negative dielectric anisotropy contained between the first and second substrates;
alignment films respectively covering surfaces of the picture element electrode and the common electrode; and
alignment control structures for controlling directions of alignment of liquid crystal molecules, the alignment control structures being provided on at least one of the first and second substrates,
wherein the alignment control structures are first slits provided in the picture element electrode and protrusions provided on the common electrode, a distance between at least one first slit and at least one protrusion being 10 to 25 μm,
the second substrate is subjected to alignment treatment in only regions substantially directly facing the first slits, and
when a voltage applied to the picture element electrode changes from a first voltage to a second voltage, transmittance increases to maximum transmittance with a change in a state of alignment of liquid crystal molecules and then decreases to transmittance in a stable state corresponding to the second voltage.

8. The liquid crystal display device according to claim 7, wherein directions of the alignment treatment are deviated from directions of the first slits by 5° to less than 99°.

9. The liquid crystal display device according to claim 7, wherein the alignment treatment is rubbing performed on the alignment film.

10. The liquid crystal display device according to claim 7, wherein the alignment treatment is ultraviolet light application in which ultraviolet light is applied to the alignment film from an oblique direction.

11. The liquid crystal display device according to claim 7, wherein the alignment treatment is formation of a plurality of second slits in the common electrode, the plurality of second slits extending in directions oblique to directions in which the first slits extend.

12. The liquid crystal display device according to claim 7, wherein the alignment treatment is formation of a plurality of dielectric film patterns on the common electrode, the plurality of dielectric film patterns extending in directions oblique to directions in which the first slits extend.

* * * * *